United States Patent [19]

Sullivan

[11] Patent Number: 4,741,471

[45] Date of Patent: May 3, 1988

[54] METHOD FOR MANUFACTURING A ROTARY ROCK BIT

[75] Inventor: Eric C. Sullivan, Houston, Tex.

[73] Assignee: Hughes Tool Company - USA, Houston, Tex.

[21] Appl. No.: 40,381

[22] Filed: Apr. 20, 1987

[51] Int. Cl.$^4$ .................. B23K 31/10; B23K 31/02; B23K 33/00
[52] U.S. Cl. .................... 228/166; 228/182; 219/124.21; 219/69 M; 76/108 A; 901/42
[58] Field of Search ............. 228/165, 166, 182, 225, 228/178; 219/121 EH, 124.21, 69 R, 69 M; 76/108 A, 101 E; 175/411, 375; 901/42, 29

[56] References Cited

U.S. PATENT DOCUMENTS

| | | | |
|---|---|---|---|
| 3,907,191 | 9/1975 | Lichte | 228/182 |
| 4,229,638 | 10/1980 | Lichte | 228/182 |
| 4,256,518 | 3/1981 | Bolton et al. | 228/165 |

FOREIGN PATENT DOCUMENTS

| | | | |
|---|---|---|---|
| 45563 | 3/1980 | Japan | 901/42 |
| 205683 | 11/1983 | Japan | 901/42 |

OTHER PUBLICATIONS

Metals Handbook, Ninth Edition, vol. 6, pp. 66, 86, 87, copyright 1983.

Primary Examiner—Nicholas P. Godici
Assistant Examiner—Samuel M. Heinrich
Attorney, Agent, or Firm—Charles D. Gunter, Jr.

[57] ABSTRACT

A method and device are shown for manufacturing rotary rock bits. The method eliminates repositioning errors in robotic welding operations by combining a cutting torch and a welding torch on a single, rotatable bracket whereby a bit can be welded at a single station without multiple rechuckings. The quality of the weld tie-in between any two intersecting seams (radial-radial or radial-axial) results where the groove for the latter seam in each pair is cut after the first seam in the pair has been welded.

5 Claims, 3 Drawing Sheets

METHOD FOR MANUFACTURING A ROTARY ROCK BIT

BACKGROUND OF THE INVENTION

1. Field of the Invention:

The present invention relates to earth boring bits and specifically to a welding method and apparatus for welding a multiplicity of individual sections together to form a rock bit.

2. Description of the Prior Art:

A rotary rock bit in general consists of a bit body made by welding separate sections together along seams between the sections. The body of a typical, contemporary bit is constructed of three sections, assembled to engage across 120 degree, machines faces and welded to form an integral body unit. A cone is mounted, prior to welding, on a cantilevered bearing shaft that extends from each section. The assembled bit has a connecting end for connection to a string of drill pipe for rotation about a vertical axis.

In recent years, attention has been focused on improvements to the welding and assembly procedures to improve the geometry, the dimensional accuracy and the design integrity of the rock bit. In the prior art method of manufacturing rotary rock bits, a weld groove was formed between adjacent sections of the bit and the weld groove was filled with a weld deposit by a welding process. Surfaces on adjoining sections were in adjacent relationship but the surfaces were not joined together and the joining of the sections was through the weld deposit. In order to correctly join the individual sections of the bit body together, they must be accurately positioned during the welding process.

A method to improve the accuracy of the assembly and welding of the sections of a rock bit is shown in U.S. Pat. No. 4,209,124, Rock Bit Assembly Method, June 24, 1980. Here, a shank positioner and a fixed ring are positioned with a fixture to hold the sections and assembled cones to minimize slippage of the sections during assembly and welding.

Another method to improve the integrity in rock bit design parameters is disclosed in U.S. Pat. No. 4,414,734, Triad For Rock Bit Assembly, Nov. 15, 1983. A specially shaped dowel called a triad is used to maintain the 120 degree faces of the sections in the intended relationship. This method further assures accuracy of alignment of the sections during assembly and welding.

In spite of these improvements, certain deficiencies were inherent in the prior art welding techniques, including the automated or robotic welding techniques. In the typical prior art technique, the bit sections were chucked in a fixture and weld grooves were formed by machining. In other prior art techniques, the weld grooves were cut along the radial and axial seams by a robot equipped with an air carbon arc cutting torch. This procedure was repeated for each bit in the group of bits being manufactured. The tooling would then be changed on the robot to permit welding with a gas shielded flux-cored-arc welding torch. Each bit would then be rechucked, in turn, and the radial and axial seams would be welded. The multiple chuckings of the bits during robotic assembly and welding have caused repositioning errors which can result in weld flaws such as lack-of-fusion defects, poor tie-ins, and spill overs.

SUMMARY OF THE INVENTION

In the manufacturing method of the invention, a rotary rock bit is manufactured by welding separate sections of the bit together along seams between the sections, the bit having a connecting end for connection to a drill string for rotation about a vertical axis. The bit sections are assembled by being chucked in a suitable fixture, the assembled sections forming radial seams which lie in planes that radially intersect the axis of rotation of the bit and forming outside, axial seams which lie in planes generally parallel to the bit axis of rotation.

A first radial weld groove is cut and then welded at a single welding station and without rechucking the bit between the cutting and welding operations by means of a welding tool having both a cutting torch and a welding torch mounted on a single bracket. In similar fashion, a second radial weld groove is then cut which intersects the first radial weld and is welded at the same welding station. This procedure is repeated for all additional radial welds. The outside, axial weld grooves are then cut each of which intersects the respective radial weld. The axial grooves are then welded at the same welding station, again without rechucking the bit. In addition to eliminating repositioning errors, an improvement in quality of the weld tie-in between any two intersecting seams (radial-radial or radial-axial) results where the groove for the latter seam in each pair is cut after the first seam in the pair has been welded.

Additional objects, features and advantages will be apparent in the written description which follows.

DESCRIPTION OF THE PREFERRED EMBODIMENT

Figure 2:
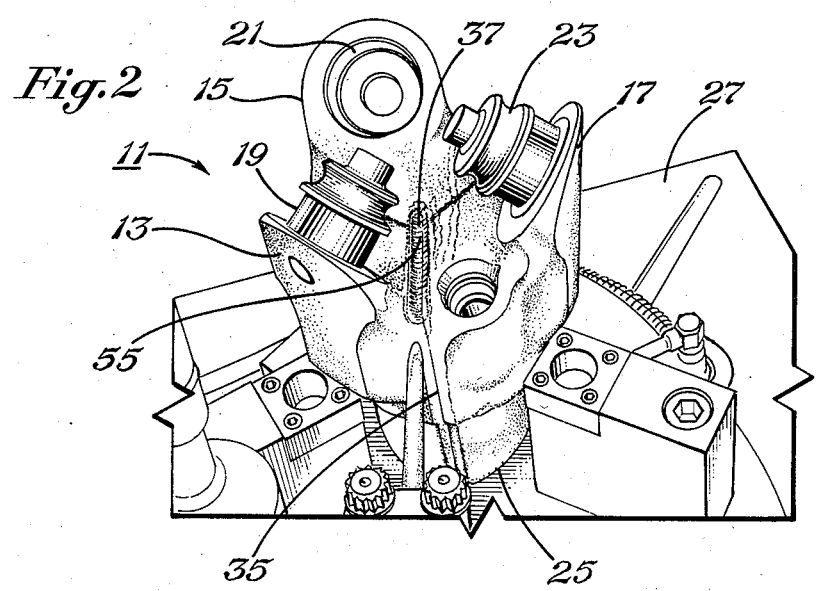
FIG. 2 is a partial, perspective view of a fixture and a bit positioned for manufacture in accordance with the method of the invention, showing a first radial cut along a radial seam formed between two of the aligned bit sections.

FIG. 2 shows a rotary rock bit, designated generally as 11, which is being manufactured using the method of the invention. The rock bit 11 is manufactured by welding separate sections 13, 15, 17 of the bit together along seams between the sections. Each of the sections includes a rotatable cutter (not shown) which is mounted on a cantilevered bearing shaft which extends from the section and which has cutters thereon for disintegrating earthen formations. The assembled bit will be provided with a connecting end 25 for connection in a drill string for rotation about a vertical axis.

The bit sections 13, 15, 17 are shown assembled in a suitable indexing fixture 27 of the type known in the industry for robotic welding of rotary rock bits. When the bit 11 is chucked in the fixture 27, the assembled section forms three radial seams 29, 31, 33 (FIG. 3) which lie in planes that radially intersect the axis of rotation of the bit and form three outside, axial seams (seam 35 shown in FIG. 2) which lie in planes generally parallel to the bit vertical axis of rotation. The vertical axis of rotation is an imaginary line which passes through the approximate point of intersection 37 of the three radial seams, as shown in FIG. 2.

Figure 1:
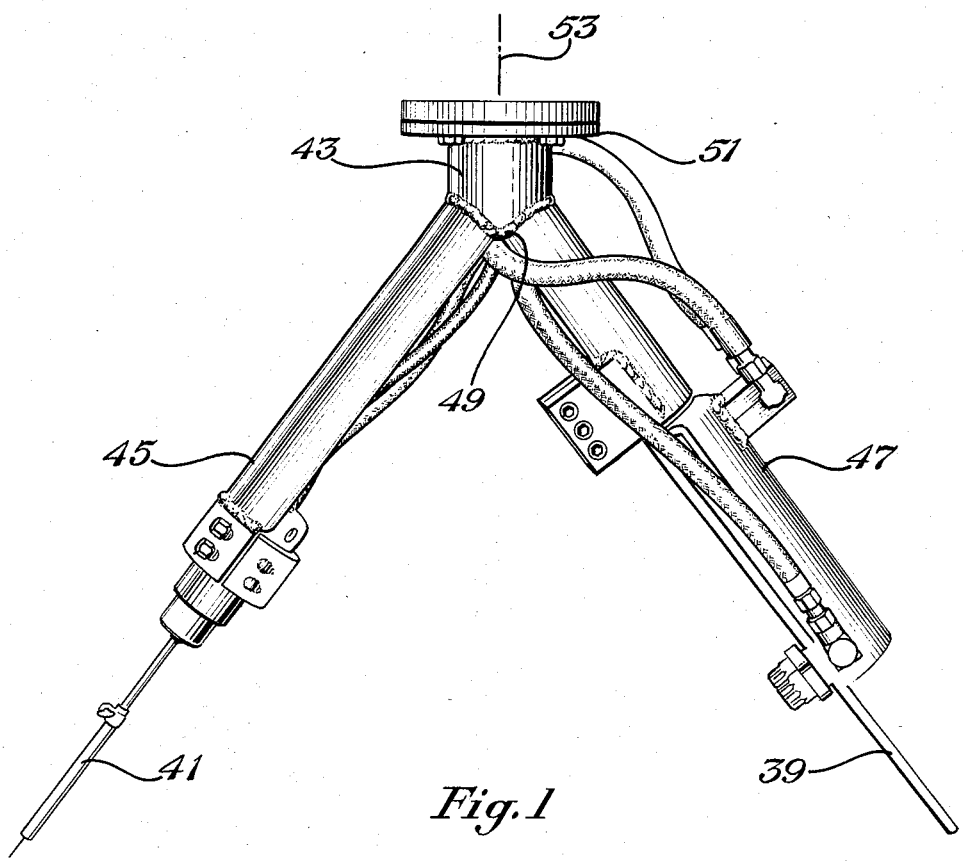
FIG. 1 is a perspective view of the welding tool used in the method of the invention, showing the cutting torch and welding torch mounted on a single bracket.

FIG. 1 shows the welding tool used in practicing the method of the invention. The welding tool has both a cutting torch 39 and a welding torch 41 mounted on a single bracket 43. The bracket 43 has one cylindrical sleeve or arm 45 which contains the welding torch 41 and another cylindrical sleeve or arm 47 for containing the cutting torch 39. The arms 45, 47 are joined at a stationary Y-shaped juncture which, in turn, is connected to a rotatable plate 51. The rotatable plate allows the arms 45, 47 to be rotated about a vertical axis 53.

The preferred cutting torch is an air carbon arc cutting torch and the preferred welding torch is a gas shielded flux-cored-arc wire welding torch, both of which are fimiliar to those in the industry.

Figure 3:
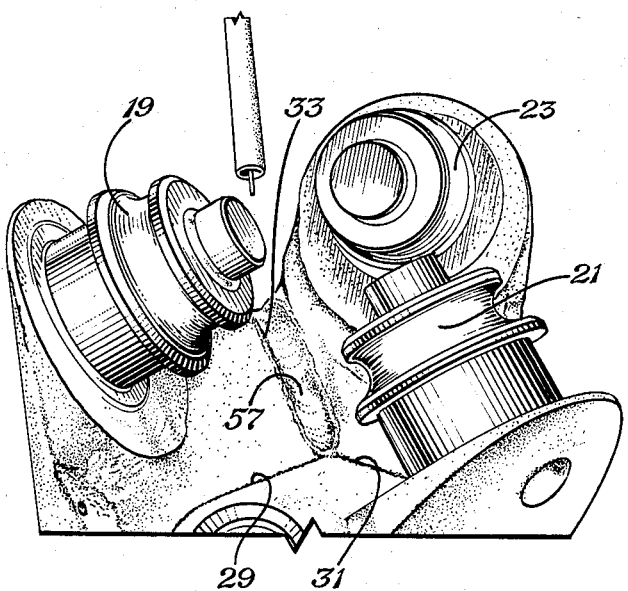
FIG. 3 is a partial, close-up view of the bit of FIG. 2, showing the weld deposit applied to the first radial seam.

The method of the invention will now be described with reference to FIGS. 2-6. In the first step of the method, a first radial weld groove (55 in FIG. 2) is cut by rotating the cutting torch 39 into position with the bit segments chucked in the fixture 27. Suitable rotational means (not shown) then rotate the bracket 43 so that the welding torch 41 is aligned for welding the first radial weld groove 55. FIG. 3 shows the first radial weld groove filled with weld deposit 57.

Figure 4:
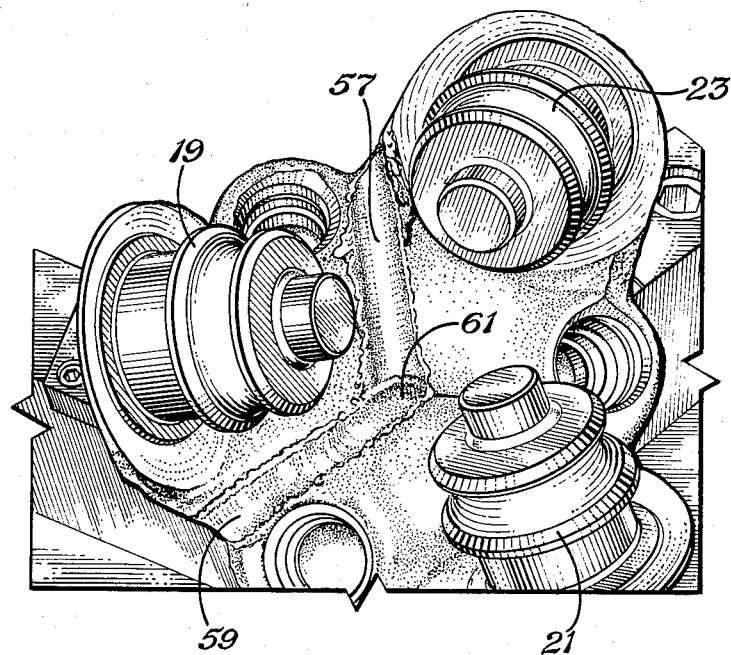
FIG. 4 is a view similar to FIG. 3, showing the second radial weld groove which is cut which intersects the first radial weld.
Figure 5:
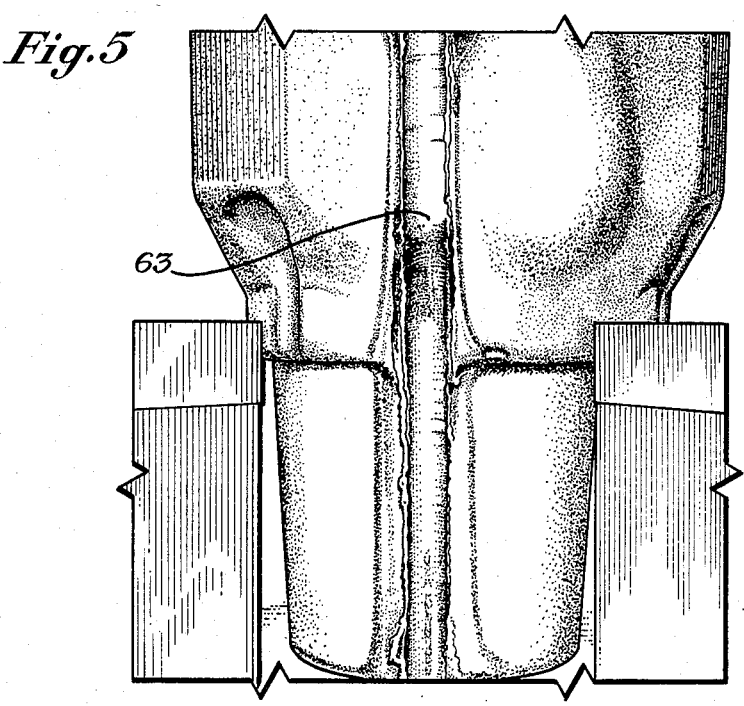
FIG. 5 is a partial, side view of the bit of FIG. 4, showing a first outside, axial cut along an axial seam formed between two of the aligned bit sections.

As shown in FIG. 4, a second radial weld groove 59 is then cut using the cutting torch 39 while the bit 11 is at the same welding station and without rechucking the bit. The second radial weld groove 59 includes a tie-in groove portion 61. The term "tie-in groove portion" is intended to describe the intersection of the second radial cut 59 with the previously cut and welded groove (indicated at 57 in FIG. 4). The second radial weld groove 59 is then welded using the welding torch 41. A third radial weld groove is then cut and welded in similar fashion along the remaining radial seam at the same welding station.

Figure 6:
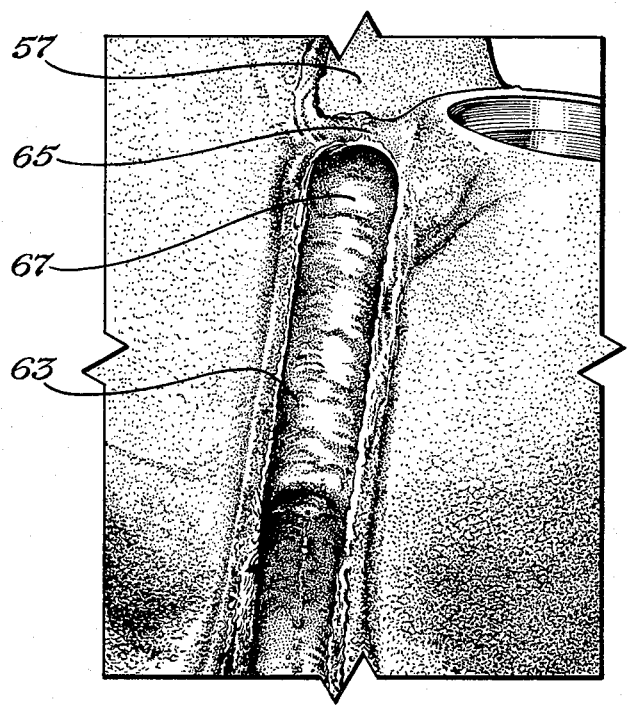
FIG. 6 is a close-up view of the point of intersection of the axial seam of FIG. 5 and its respective radial weld.

Next, an outside, axial groove (63 in FIG. 5) is cut which intersects the radial seam (35 in FIG. 2) and which intersects the respective radial weld (57 in FIG. 6). The outside axial groove 63, as shown in FIG. 6, includes a tie-in tab 65 at the crotch region 67. Axial grooves are then cut in similar fashion along the remaining outside axial seams, followed by welding each of the outside, axial weld grooves with the welding torch 41 at the same welding station. The bit 11 can then be removed from the fixture 27 and the procedure can be repeated for the next bit to be manufactured.

The following example is illustrative of the preferred method of the invention:

A 7⅞" bit was manufactured according to the following manufacturing steps:
(1) The head section 120 degree surfaces were first degreased;
(2) The bit sections were then chucked and the bit gauge was checked;
(3) The bit sections were welded at a single station without rechucking the sections as follows:

(a) Cut radial seam number one (two passes);
(b) Weld radial seam number one (one pass);
(c) Cut radial seam (two passes) and weld radial seam (one pass) for radial seam number 2;
(d) Cut radial seam (two passes) and weld radial seam (one pass) for radial seam number 3;
(e) Cut axial seam number one (two passes);
(f) Cut axial seam (two passes) for axial seam number two;
(g) Cut axial seam (two passes) for axial seam number three;
(h) Weld axial seam number one (four passes);
(i) Weld axial seam (four passes) for axial seam number two; and
(j) Weld axial seam (four passes) for axial seam number three.
(4) The bit was then removed and cooled in water with the cones submerged;
(5) The bit was then shanked and threaded.

TABLE ONE (Cutting and welding data for Example One)

I. Air carbon arc cutting data
  a. Arc voltage: 38–40 volts
  b. Amperage: 100–600 amps, DCEP, CP
  c. Travel Speed: 12–24 ipm
  d. Electrode diameter: ⅜ inch diameter
  e. Radial seam cutting time (arc only): 42 seconds.
  f. Axial seam cutting time (arc only): 186 seconds.
II. Gas shielded flux core wire welding data.
  a. Filler material: Alloy Rods Coreweld 70
  b. Shielding gas (5% carbon dioxide, 95% argon)
  c. Electrode stickout: approximately ⅝"
  d. Arc voltage: 20–34 volts
  e. Amperage: approximatly 200–400 amps DCEP, CP
  f. Radial seam weld time (arc only): 111 seconds.
  g. Axial seam weld time (arc only): 354 seconds.

An invention has been provided with several advantages. Multiple chucking of bits during robotic assembly causes repositioning errors that are responsible for lack fusision defects, poor tie-ins and spillovers. Combining the cutting and welding torchs on a single bracket permits both cutting and welding operations to be accomplished in a single chucking and, therefore, eliminates defects caused by repositioning. The quality of the weld tie-in between any two intersecting seams (radial-radial or radial-axial) is greatly improved where the latter seam in each pair is formed after the weld for first seam is made. This is possible by the use of the method of the invention, allowing the tie-in areas to be optimally shaped to receive the weld deposit.

While the invention has been shown in only one of its forms, it is not thus limited but is susceptible to various changes and modifications without departing from the spirit thereof.

I claim:

1. A method for manufacturing a rotary rock bit by welding separate sections of the bit together along seams between the sections, the bit having a connecting end for connection to a drill string for rotation about a vertical axis, comprising the steps of:

assembling the bit sections in a suitable fixture, the assembled sections forming radial seams which lie in planes that radially intersect the axis of rotation of the bit and forming outside, axial seams which lie in planes generally parallel to the bit axis of rotation;

cutting a first radial weld groove and then welding the first radial weld groove at a single welding station by means of a welding tool having both a cutting torch and a welding torch mounted on a single bracket;

cutting a second radial weld groove end which intersects the first radial weld and then welding the second radial weld groove at the same welding station;

repeating the process for all additional radial welds;

cutting outside, axial weld grooves which intersect each radial weld and welding the outside, axial weld grooves at the same welding station.

2. A method for manufacturing a rotary rock bit by welding separate sections of the bit together along seams between the sections, the bit having a connecting end for connection in a drill string for rotation about a vertical axis, comprising the steps of:

assembling the bit sections in a suitable fixture, the assembled sections forming radial seams which lie in planes that radially intersect the axis of rotation of the bit and forming outside, axial seams which lie in planes generally parallel to the bit axis of rotation;

cutting a first radial weld groove and then welding the first radial weld groove at a single welding station by means of a welding tool having both a cutting torch and a welding torch mounted on a single bracket;

cutting a second radial weld groove including a tie-in groove with the first radial weld and then welding the second radial weld groove at the same welding station;

repeating the process for all additional radial welds;

cutting outside, axial weld grooves which intersect each radial weld and which include a tie-in groove at the point of intersection with the respective radial weld and welding the outside, axial weld groovs at the same welding station.

3. A method for manufacturing a rotary rock bit by welding separate sections of the bit together along seams between the sections, each of the sections including a rotatable cutter mounted on a bearing pin extending from the section, the bit having a connecting end for connection in a drill string for rotation about a vertical axis, comprising the steps of:

assembling three bit sections in a suitable fixture, the assembled sections forming three radial seams which lie in planes that radially intersect the axis of rotation of the bit and forming three outside, axial seams which lie in planes generally parallel to the bit axis of rotation;

cutting a first radial weld groove and then welding the first radial weld groove at a single welding station by means of a welding tool having both a cutting torch and a welding torch mounted on a single bracket;

cutting a second radial weld groove including a tie-in groove with the first radial weld and then welding the second radial weld groove at the same welding station;

cutting a third radial weld groove including a tie-in groove with the second radial weld and then welding the third radial weld groove at the same welding station;

next, cutting an outside, axial weld groove which intersects each radial weld and which includes a tie-in groove at the point of intersection with the respective radial weld, followed by welding each of the outside, axial weld grooves at the same welding station.

4. The method of claim 3, wherein the cutting operation is performed by means of an air carbon arc cutting torch and wherein the welding operation is performed by means of a gas shielded flux-cored-arc welding torch.

5. The method of claim 4, wherein the welding tool is provided with a welding torch on one arm and a cutting torch on another arm, the arms being joined at a stationary, Y-shaped juncture, and wherein the juncture is connected to a rotatable plate adapted to rotate the arms about a vertical axis.

* * * * *